(12) United States Patent
Tsuchikawa et al.

(10) Patent No.: US 11,797,154 B2
(45) Date of Patent: Oct. 24, 2023

(54) INSERTING A GRAPHICAL ELEMENT CLUSTER IN A TILED LIBRARY USER INTERFACE

(71) Applicant: Sony Interactive Entertainment, Inc., Tokyo (JP)

(72) Inventors: Yuji Tsuchikawa, San Francisco, CA (US); Ryan D. Sutton, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 88 days.

(21) Appl. No.: 16/870,725

(22) Filed: May 8, 2020

(65) Prior Publication Data

US 2021/0349579 A1 Nov. 11, 2021

(51) Int. Cl.
*G06F 3/0482* (2013.01)
*G06F 3/04817* (2022.01)
(Continued)

(52) U.S. Cl.
CPC ............ *G06F 3/0482* (2013.01); *A63F 13/23* (2014.09); *A63F 13/48* (2014.09); *A63F 13/493* (2014.09);
(Continued)

(58) Field of Classification Search
None
See application file for complete search history.

(56) References Cited

U.S. PATENT DOCUMENTS

| | | | |
|---|---|---|---|
| 5,497,455 A | * | 3/1996 | Suga ..................... G06F 3/0481 715/810 |
| 6,101,506 A | | 8/2000 | Ukai et al. |

(Continued)

FOREIGN PATENT DOCUMENTS

| | | |
|---|---|---|
| EP | 2713260 A1 | 4/2014 |
| WO | 2014130321 A2 | 8/2014 |
| WO | 2015066658 A1 | 5/2015 |

OTHER PUBLICATIONS

PCT/US2021/030336, "International Search Report and the Written Opinion", dated Aug. 11, 2021, 15 pages.

(Continued)

*Primary Examiner* — Michael Roswell
*Assistant Examiner* — Maria S Ayad
(74) *Attorney, Agent, or Firm* — Kilpatrick Townsend & Stockton LLP

(57) ABSTRACT

Techniques are described for presenting selectable tiles on a user interface. In an example, the techniques include providing a graphical user interface, including an immediate selection area and a full selection area, for user interface (UI) elements, some being selectable to launch or resume a corresponding computer application. The techniques also include determining a library of computer applications that a user executed or obtained. The techniques also include selecting a first subset of the library of computer applications a number of items in the first subset being limited. The techniques also include rendering UI elements of the first subset on the graphical user interface in the immediate selection area. The techniques also include identifying a second subset of items from the library. The techniques also include displaying UI elements of the library in the full selection area of the graphical user interface.

20 Claims, 9 Drawing Sheets

(51) Int. Cl.
*A63F 13/23* (2014.01)
*A63F 13/48* (2014.01)
*A63F 13/493* (2014.01)

(52) U.S. Cl.
CPC .. *G06F 3/04817* (2013.01); *A63F 2300/1025* (2013.01); *A63F 2300/636* (2013.01)

(56) References Cited

U.S. PATENT DOCUMENTS

| | | | |
|---|---|---|---|
| 7,770,125 | B1 | 8/2010 | Young et al. |
| D761,842 | S | 7/2016 | Johnson et al. |
| 9,519,471 | B2* | 12/2016 | Machalani ............ G06F 8/61 |
| 9,640,138 | B2* | 5/2017 | Yasuda ............ G06F 1/3278 |
| 9,819,997 | B2* | 11/2017 | Seo ................ H04N 21/4826 |
| 10,387,940 | B2 | 8/2019 | Akkiraju et al. |
| 10,628,870 | B2 | 4/2020 | Akkiraju et al. |
| 11,003,312 | B2 | 5/2021 | Sakaino et al. |
| 11,095,946 | B2* | 8/2021 | Domm ............ H04N 21/4788 |
| 11,169,665 | B2 | 11/2021 | Hunter et al. |
| 11,402,973 | B2 | 8/2022 | Tsuchikawa et al. |
| 2003/0181242 | A1 | 9/2003 | Lee et al. |
| 2006/0218499 | A1* | 9/2006 | Matthews ............ G06F 16/313 715/765 |
| 2007/0067798 | A1 | 3/2007 | Wroblewski |
| 2007/0112852 | A1 | 5/2007 | Sorvari et al. |
| 2008/0034381 | A1 | 2/2008 | Jalon et al. |
| 2009/0019398 | A1 | 1/2009 | Hansson et al. |
| 2010/0313156 | A1* | 12/2010 | Louch ................ G06F 3/04817 715/769 |
| 2011/0032250 | A1 | 2/2011 | Tanaka et al. |
| 2011/0252361 | A1* | 10/2011 | Tsuda ................ G06F 9/451 715/781 |
| 2012/0204131 | A1 | 8/2012 | Hoang et al. |
| 2012/0284673 | A1* | 11/2012 | Lamb ................ G06F 3/04883 715/863 |
| 2013/0036380 | A1 | 2/2013 | Symons |
| 2013/0038637 | A1* | 2/2013 | Yamanaka ............ G06F 3/0485 345/684 |
| 2013/0055162 | A1 | 2/2013 | Arriola et al. |
| 2013/0067393 | A1* | 3/2013 | Demopoulos ......... G06F 3/0482 715/784 |
| 2013/0290886 | A1* | 10/2013 | Chen ................ G06F 3/0482 715/768 |
| 2014/0096083 | A1 | 4/2014 | Kim et al. |
| 2015/0128042 | A1* | 5/2015 | Churchill ............ H04N 21/4438 715/718 |
| 2015/0169699 | A1 | 6/2015 | Gilbert et al. |
| 2015/0189390 | A1 | 7/2015 | Sirpal et al. |
| 2015/0222700 | A1 | 8/2015 | Kay et al. |
| 2015/0309691 | A1* | 10/2015 | Seo ................ H04M 1/0241 345/173 |
| 2015/0370456 | A1* | 12/2015 | Kobayashi ............ G06F 3/0489 463/32 |
| 2016/0041719 | A1* | 2/2016 | Wang ................ G06F 3/04883 715/769 |
| 2016/0182963 | A1* | 6/2016 | Unwin ............ H04N 21/47202 725/41 |
| 2016/0209993 | A1 | 7/2016 | Singal et al. |
| 2016/0224211 | A1* | 8/2016 | Xu ................ H04M 1/72472 |
| 2017/0060388 | A1 | 3/2017 | Einaudi |
| 2017/0090867 | A1* | 3/2017 | Lifar ................ G06F 7/24 |
| 2017/0091336 | A1* | 3/2017 | Royzner ............ G06F 16/435 |
| 2017/0153792 | A1* | 6/2017 | Kapoor ............ G06F 3/04886 |
| 2017/0323279 | A1 | 11/2017 | Dion et al. |
| 2017/0371920 | A1* | 12/2017 | Churchill ............ G06F 3/04842 |
| 2018/0025315 | A1 | 1/2018 | Cortes et al. |
| 2018/0091865 | A1 | 3/2018 | Pearlman et al. |
| 2018/0107146 | A1 | 4/2018 | Shinohara et al. |
| 2018/0342328 | A1 | 11/2018 | Chan et al. |
| 2018/0348978 | A1 | 12/2018 | Audet et al. |
| 2018/0371545 | A1 | 12/2018 | Wong et al. |
| 2019/0370282 | A1 | 12/2019 | Vergnaud et al. |
| 2020/0081592 | A1* | 3/2020 | Lin ................ G06F 3/0485 |
| 2021/0011609 | A1* | 1/2021 | Zhang ................ G06F 9/451 |
| 2021/0349586 | A1 | 11/2021 | Tsuchikawa et al. |

OTHER PUBLICATIONS

PCT/US2021/030339, "International Search Report and Written Opinion", dated Aug. 4, 2021, 11 pages.
PCT/US2021/030333, "International Search Report and Written Opinion", dated Aug. 4, 2021, 11 pages.
PCT/US2021/030333, "International Preliminary Report on Patentability", dated Nov. 17, 2022, 9 pages.
PCT/US2021/030336, "International Preliminary Report on Patentability", dated Nov. 17, 2022, 10 pages.
PCT/US2021/030339, "International Preliminary Report on Patentability", dated Nov. 17, 2022, 8 pages.

* cited by examiner

INSERTING A GRAPHICAL ELEMENT CLUSTER IN A TILED LIBRARY USER INTERFACE

BACKGROUND

1. Field of the Invention

The present application generally relates to electrical computer graphical user interfaces (GUIs), layout modifications such as moving or resizing. Specifically, the application relates to decluttering and redeploying multiple icons or other user interface elements in a recently used menu, library, and other cluster based on practical criteria.

2. Description of the Related Art

Graphical user interfaces (GUIs) are the predominant type of interfaces available to users for interacting with computer systems. A GUI includes selectable icons to launch applications on a computer system. Typically, to launch a specific application, a user of the GUI identifies the application in a file browser or menu application and affirmatively selects the application before launching it. In certain situations, the user may interact with a number of applications on a regular basis. In such cases, the user uses the file browser or menu application and reviews an entire collection of applications to return to a recently launched and/or obtained application.

To illustrate, consider an example of a GUI of a video game system hosting a number of applications and media files. The GUI presents a home page that includes a number of video game icons and a number of media content icons. From this home page, a video game player selects a video game icon to launch a video game application. The video game application that is launched by the video game system corresponds to the video game icon selected. Similarly, selecting a media content icon will launch the corresponding episodic audiovisual content. During the course of using the video game system, the user may launch four different video game applications, listen to three media files, download and/or install two additional video game applications by accessing a content platform, and then wish to return to the first video game application. In such a situation, the user would navigate the base directory, file browser, and/or menu application to select each video game application, media file, or store application in turn, by selecting from amongst all the available applications and files, despite knowing that the desired application was recently launched.

Hence, although a GUI can be an effective user interface, selecting applications and content may not be seamless and the presentation of information may be unintuitive, requiring multiple steps to confirm the correct selection or repeated reselection. There is a need for an improved GUI that allows streamlined selection of applications of greatest interest to the user.

BRIEF SUMMARY

Generally, a graphical user interface (GUI) for a video game console or other computer interface is disclosed that has a line of "recently played/viewed" icons and a grid of icons of the user's general library of games, etc. Depending on the number of items that are in the recently played/viewed line, and/or the number of items in the library grid, a set of icons from the library grid is highlighted and presented as a cluster that is distinct from the grid. The icons in the cluster are selected from the user's general library of games so that the GUI presents icons that are not included in the line of "recently played/viewed" icons. When the user selects one of the icons from the cluster, for example to launch an associated video game, the icon is removed from the cluster and added to the line of "recently played/viewed" icons, replacing one of the icons.

In a first aspect, a method of arranging a graphical user interface having multiple selection interfaces includes providing a graphical user interface for user interface (UI) elements, some of the UI elements being selectable to launch or resume a corresponding computer application, the graphical user interface including an immediate selection area and a full selection area. Optionally, the UI elements are icons. The method further includes determining a library of computer applications that a user executed or obtained. Optionally, the computer applications are video games. The method further includes selecting a first subset of the library of computer applications based on a last execution date of each of the computer applications by the user, a number of items in the first subset being limited. Optionally, the method further includes including a fixed set of default computer applications in the first subset. The method further includes rendering UI elements of the first subset on the graphical user interface in the immediate selection area. Optionally, a library UI element for displaying the full selection area is included in the immediate selection area. Optionally, rendering of the UI elements of the first subset is aligning the UI elements of the first subset in a single row at a top of the graphical user interface or a single column on a side of the graphical user interface. The method further includes identifying a second subset of items from the library that are not within the first subset. Optionally, the method further includes comparing a total count of items in the library to a threshold, the identifying of the second subset based on the comparing. Optionally, the method further includes comparing a total count of items in the first subset to a second threshold, the identifying of the second subset based on the comparing. Optionally, the common sizes of the UI elements of the first subset and the UI elements of the library not including the second subset are an equal size. The method further includes displaying UI elements of the library in the full selection area of the graphical user interface with UI elements of the second subset at a top or a side of the full selection area. Optionally, the method further includes assessing whether the second subset will include a minimum number of items, wherein the displaying is based on the assessing. Optionally, the method further includes receiving a selection by the user of the library UI element, wherein the displaying of the UI elements of the library is based upon the user selection. Optionally, the UI elements of the first subset share a common size with each other, the UI elements of the second subset share a common size with each other, and the UI elements of the library not including the second subset share a common size with each other. Optionally, displaying of the UI elements of the second subset includes aligning the UI elements of the second subset in a single row.

Optionally, the method further includes launching a first computer application in response to a user's selection of a corresponding UI element in the second subset of the graphical user interface. In such cases, the method also further includes adding, based on the launching, the first computer application to the first subset and re-rendering the UI elements of the first subset, and removing a second computer application from the first subset.

In a second aspect, a machine-readable tangible medium for arranging a graphical user interface having multiple selection interfaces, the medium embodying information indicative of instructions for causing one or more machines to perform operations including providing a graphical user interface (UI) for user interface (UI) elements, some of the UI elements being selectable to launch or resume a corresponding computer application, the graphical user interface including an immediate selection area and a full selection area.

The operations further include determining a library of computer applications that a user executed or obtained.

The operations further include selecting a first subset of the library of computer applications based on a last execution date of each of the computer applications by the user, a number of items in the first subset being limited.

The operations further include rendering UI elements of the first subset on the graphical user interface in the immediate selection area.

The operations further include identifying a second subset of items from the library that are not within the first subset. Optionally, the operations further include comparing a total count of items in the library to a threshold, the identifying of the second subset based on the comparing.

The operations further include displaying UI elements of the library in the full selection area of the graphical user interface with UI elements of the second subset at a top or a side of the full selection area.

Optionally, the operations further include launching a first computer application in response to a user's selection of a corresponding UI element in the second subset of the graphical user interface. In such cases, the operations also further include adding, based on the launching, the first computer application to the first subset and re-rendering the UI elements of the first subset, and removing a second computer application from the first subset.

In a third aspect, a computer system having multiple selection interfaces includes a memory, and at least one processor operatively coupled to the memory and executing instructions from the memory comprising program code for providing a graphical user interface for user interface (UI) elements, some of the UI elements being selectable to launch or resume a corresponding computer application, the graphical user interface including an immediate selection area and a full selection area.

The system further provides program code for determining a library of computer applications that a user executed or obtained.

The system further provides program code for selecting a first subset of the library of computer applications based on a last execution date of each of the computer applications by the user, a number of items in the first subset being limited.

The system further provides program code for rendering UI elements of the first subset on the graphical user interface in the immediate selection area.

The system further provides program code for identifying a second subset of items from the library that are not within the first subset. Optionally, the system further provides program code comparing a total count of items in the library to a threshold, the identifying of the second subset based on the comparing.

The system further provides program code for displaying UI elements of the library in the full selection area of the graphical user interface with UI elements of the second subset at a top or a side of the full selection area.

Optionally, the system further provides program code for launching a first computer application in response to a user's selection of a corresponding UI element in the second subset of the graphical user interface. In such cases, the system also further provides program code for adding, based on the launching, the first computer application to the first subset and re-rendering the UI elements of the first subset, and removing a second computer application from the first subset.

DETAILED DESCRIPTION

Figure 1:
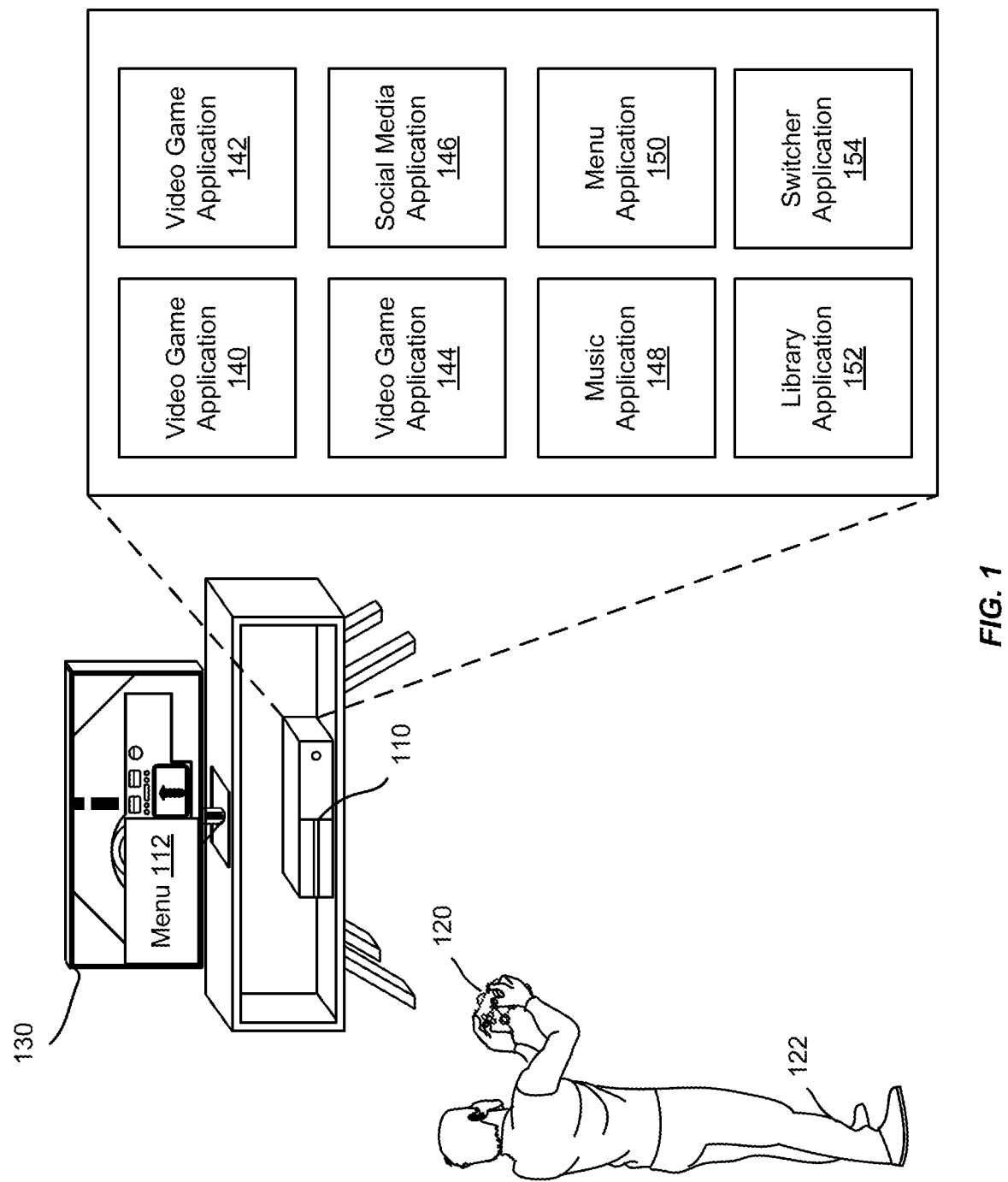
FIG. 1 illustrates a computer system that presents a menu, according to an embodiment of the present disclosure.

Generally, systems and methods for improved information sharing and navigation in a graphical user interface (GUI) are described. In an example, a user of a computer system may access or launch a large number of user applications. The computer system presents information about the applications in a GUI on a display. In particular, each application can be shown with a single UI element (e.g., an icon) in a menu on the GUI. In other words, the menu presents a plurality of UI elements and each one of the UI elements corresponds to one of the applications. A UI element corresponding to an application presents content that may aid the user to identify the application as well as metadata concerning the access status, storage status, and usage of the application. Upon a user selection of a UI element, the computer system launches the linked application or a page associated with the application.

The computer system selects a first subset of UI elements to present in a first menu, selected from a library of UI elements. The selection can be based on how recently the user of the computer system last interacted with the application, for example, launching, executing, installing or obtaining the application. The computer system applies a set of logic to determine whether a second selection of UI elements is to be made, to populate a second subset of UI elements. When the criteria are satisfied, the selection of the second subset of UI elements can be based on improving visibility of UI elements from the library that are not already included in the first subset. When selected, the second subset of UI elements can be presented in the GUI as part of a second menu including both the second subset of UI elements and the library of UI elements. The second menu can present the second subset of UI elements more prominently than the library of the UI elements in order to improve menu navigation to UI elements not in the first subset.

To illustrate, consider an example of a video game system. The video game system can host a menu application and a number of video game applications. The menu application can associate each of the video game applications with a UI element, also referred to as a tile or icon. A video game player can login to the video game system. The menu application can determine that the video game player has access privileges to a given number of video game applications and has accessed some video game applications more recently than others. Upon a user button push on a video game controller, a menu can be presented and can include different tiles. Each tile corresponds to at least one of the game applications. The menu arranges the tiles in order of most recent interaction, grouped into a first subset and a library, where the order of tiles is reproduced in both the first subset and the library. The first subset includes the first eight tiles of the library.

To reduce redundancy of menu presentation, the menu application selects four tiles, starting at the ninth tile of the library, to present in a second subset of tiles above the library tiles in the menu. The second subset of tiles are presented in a larger size, as much as 1.25×, 1.50×, or more between the first subset of tiles and the library of tiles in the menu. By including the second subset of tiles in the menu, the user of the video game system can select a tile that is not in the first subset of tiles, without scrolling through the library. Selecting a tile from the second subset replaces a tile in the first subset, in light of the fact that the tile form the second subset becomes the most recently selected tile.

Embodiments of the present disclosure provide several advantages over existing GUIs and their underlying computer systems. For example, selecting and presenting the second subset of tiles streamlines menu navigation. In particular, menu redundancy is reduced by presenting UI elements that otherwise would have necessitated presentation in different tabs and/or scrollable sections of the menu. Further, the menu is intuitive because the second subset can be selected to promote applications to a user of the menu and selection is updated dynamically based on user interactions. Such improvements to the navigability and intuitiveness of the menu may reduce system computational demands arising from the need to otherwise navigate large menus with a large number of icons, and may improve user experience by reducing frustration and fatigue caused by inefficient menu navigation.

In the interest of clarity of explanation, the embodiments may be described in connection with a video game system including a video game console. However, the embodiments are not limited as such and similarly apply to any other type of a computer system. Generally, a computer system presents a menu in a GUI on a display. The menu presents UI elements, each corresponding to an application.

FIG. 1 illustrates a computer system that presents a menu, according to an embodiment of the present disclosure. As illustrated, the computer system includes a video game console 110, a video game controller 120, and a display 130. Although not shown, the computer system may also include a backend system, such as a set of cloud servers, that is communicatively coupled with the video game console 110.

The video game console 110 is communicatively coupled with the video game controller 120 (e.g., over a wireless network) and with the display 130 (e.g., over a communications bus). A video game player 122 operates the video game controller 120 to interact with the video game console 110. These interactions may include playing a video game presented on the display 130, interacting with a menu 112 presented on the display 130, and interacting with other applications of the video game console 110 (e.g., with media applications to stream media from an online content source or to play a media file from the local storage of the video game console 110).

The video game console 110 includes a processor and a memory (e.g., a non-transitory computer-readable storage medium) storing computer-readable instructions that can be executed by the processor and that, upon execution by the processor, cause the video game console 110 to perform operations related to various applications. In particular, the computer-readable instructions can correspond to program codes for the various applications of the video game console 110 including video game applications 140, 142, and 144 and media applications 146 and 148. A video game application generally represents a computer application executable to present video game content, receive user interaction with the video game content, and accordingly update the video game content. A media application generally represents a computer application executable to present media content including audio, video, and/or other media types, receive user interaction with the media content, and accordingly update the media content. The media content can be streamed from a remote content source or can be presented form local storage of the video game console 110. Further, other applications can be likewise included in the video game console 110, such as a social media application, a chat application, and the like. The availability of a video game application, media application, and/or other type of computer application to the video game player 122 via the video game console 110 can depend on a user identifier of the video game player 122 (e.g., upon a login to the video game console 110, the availability of the computer applications can depend on the user identifier used in the login). In addition, the video game console 110 includes a menu application 150, a library application 152, and a switcher application 154. The menu application 150 can present a home user interface (UI) in a GUI of the display 130. The library application 152 can present a library of UI elements in a library menu on the GUI. And the switcher application 154 can present a ribbon of UI elements in a ribbon menu on the GUI to allow scrolling between different UI elements and switching between corresponding applications.

The video game controller 120 is an example of an input device. Other types of the input device are possible including, a keyboard, a touchscreen, a touchpad, a mouse, an optical system, or other user devices suitable for receiving input of a user.

Upon an execution of the video game application 140 by the video game console 110, a rendering process of the video game console 110 presents video game content (e.g., illustrated as a car race video game content) on the display 130. Upon user input from the video game controller 120 (e.g., a user push of a particular key or button), the rendering process also presents the menu 112. Depending on the user input, the menu 112 corresponds to the home UI menu, the library menu, or the ribbon menu. The menu 112 can be presented in a layer over the video game content.

Upon the presentation of the menu 112, the user control changes from the video game application 140 to the menu application 150. Upon receiving a user input from the video game controller 120 requesting interactions with the menu 112, an underlying application (e.g., the menu application 150, the library application 152, or the switcher application 154 as applicable) supports such interactions by updating the menu 112 and launching any relevant application in the background or foreground. The video game player 122 can exit the menu 112 or automatically dismiss the menu 112 upon the launching of an application in the background or foreground. Upon exiting the menu 112 or the dismissal based on a background application launch, the user control changes from the underlying application to the video game application 140.

As described in more detail in reference to FIGS. 2-4, below, the library application 152, when executed, may generate a menu (e.g., a "library menu" including a "game library menu" for video game applications and a "media library menu" for files related to media applications) configured to present the applications and/or files as interactive and/or dynamic tiles.

The term "tile" is used herein as an example of an interactive UI element generated and/or presented by the library application 152 and corresponding to an application. Other implementations to present a UI element are possible, including any type of icon, whether a tile, a thumbnail, a text description, a multiple column element with textual or graphical description in each column, and the like. As described further, below, tiles may be presented with application information and/or dynamic content presented with the tile in the media library.

Although the following description focuses on the library application 152 presenting tiles representing video game applications, the library application 152 may similarly generate and/or present tiles associated with media applications, other types of computer applications, and/or computer files (e.g., content files such as photos, video, animations, multimedia, and the like).

As described in more detail in reference to FIGS. 2-4, below, the library application 152 may be executed via multiple avenues of ingress. For example, the library application 152 may be executed by a pre-defined user interaction (e.g., via controller 120, a voice command from the video game player 122, etc.) and/or by navigating one or more menus and/or sub-menus of the video game console 110 (e.g., menu 112). In some embodiments, the switcher application 154 generates and/or presents a tile associated with the library application 152, that causes the video game console 110 to execute the library application 152 when the video game player 122 interacts with the respective tile.

In general, the switcher application 154 may facilitate selection of a first subset of tiles to present in an immediate selection area of a library interface, as described in more detail in reference to FIGS. 2-4, below. The switcher application 154 may populate the first subset of tiles with tiles associated with system applications, video game applications, other forms of content, etc., and present the first subset of tiles as part of a library interface.

Although FIG. 1 illustrates that the different applications are executed on the video game console 110, the embodiments of the present disclosure are not limited as such. Instead, the applications can be executed on the backend system (e.g., the cloud servers) and/or their execution can be distributed between the video game console 110 and the backend system.

Figure 2:
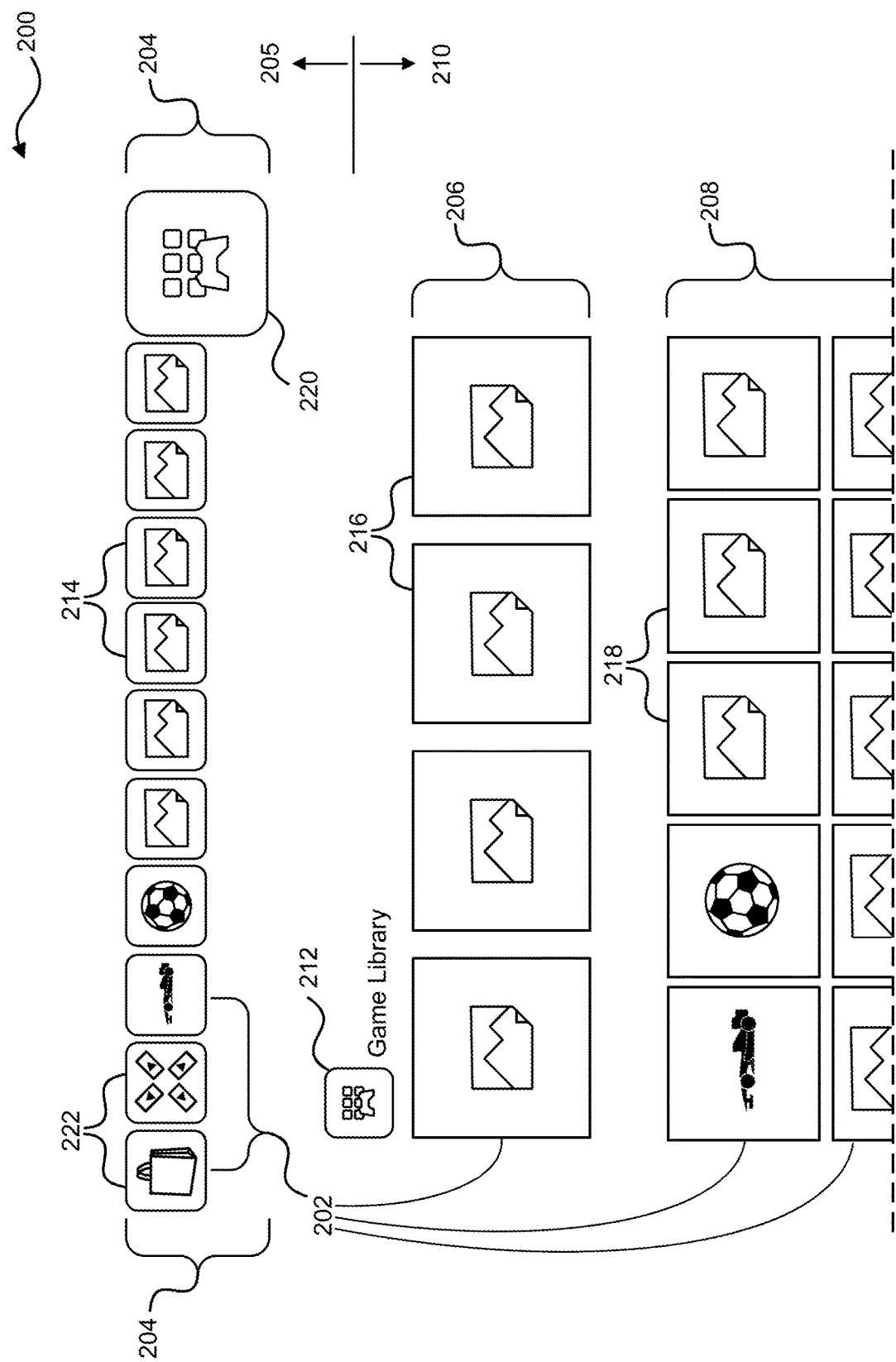
FIG. 2 illustrates an example of a library with an immediate selection area and a full selection area, according to an embodiment of the present disclosure.

FIG. 2 illustrates an example of a library interface 200 with an immediate selection area 205 and a full selection area 210, according to an embodiment of the present disclosure. As described in more detail in reference to FIG. 1, the library interface 200 is generated and/or presented by one or more system applications, or a combination of more than one system application. For example, a switcher application (e.g., switcher application 154 of FIG. 1) may generate and/or present the immediate selection area 205. Additionally and/or alternatively, a library application (e.g., library application 152 of FIG. 1) may generate and/or present the full selection area 210. In some embodiments, a single application generates the library interface 200. FIG. 2 illustrates the library interface 200 provided on a video game console, but alternative and/or additional embodiments include different computer systems including, but not limited to, those described above.

As shown in FIG. 2, the library interface 200 is a user interface (UI) that includes one or more subsets of different types of UI elements 202 (also referred to as "tiles" and "icons"). As illustrated, the library interface 200 includes an a first subset 204 of tiles 202, a second subset 206 of tiles 202, and a library 208 of tiles 202. As described in more detail in reference to FIG. 5, below, the tiles 202 are each associated with an application available to the user of video game console (e.g., video game player 122 of FIG. 1) generating and/or presenting the library interface 200. As illustrated in FIG. 2, the tiles 202 may have a uniform presentation including a uniform size and regular spacing in the library interface 200. The second subset 206, as described below, may be presented in a larger size, with each tile 202 making up the second subset 206 being uniform in size. Similarly, the tiles 202 making up the first subset 204 and the full library 208 may be presented with a uniform size. Alternatively, user interaction may be facilitated by one of the tiles 202 with which the user is interacting being emphasized. For example, the library interface 200 may present a given tile with a larger or different size, or with different highlighting, to emphasize that the user selection will launch the video game application associated with the given tile.

The library interface 200 is broadly separated into two areas, the immediate selection area 205 and the full selection area 210. As described above, the immediate selection area 205 provides streamlined access to a subset of recently accessed and/or obtained applications from a full library of applications available to the user of the computer system. Implementing the library interface 200 may reduce computational demands for generating and/or presenting an interface for application selection, relative to conventional file browsers, for example, by promoting to the immediate selection area 205 a subset of tiles 202 more likely to be selected by the user of the video game console. The user may thereby find a desired tile 202 without searching the full library 208, which would permit the library application to populate a number of tiles in the library interface 200 corresponding to only a fraction of the total number of applications available to the user of the video game console, including, for example, locally installed applications, streaming applications, shared applications, etc. In addition to providing an improvement to the operation of the video game console, the library interface 200 may also provide an improved user experience, at least in part by permitting the user of the video game console to spend relatively less time finding selecting an application from amongst the available applications, and/or switching seamlessly between applications.

In some embodiments, the library interface 200 includes an interface control tile 212 (also referred to as a "home" button). The interface control tile 212 may permit the user to navigate between the library interface 200 and other menus of the video game console. For example, the video game console may implement a menu hierarchy or other organizational structure to promote intuitive navigation between different system functions. As illustrated in FIG. 2, the interface control button 212 permits the user of the video game console to switch between navigating the immediate selection area 205 and the full selection area 210 of the library interface 200. For example, by selecting the interface control tile 212, the tiles 202 in the second subset 206 and the library 208 may be dimmed, obscured, hidden, or otherwise de-emphasized, with user control (e.g., by a movable cursor not shown) shifted to the first subset 204 of tiles in the immediate selection area 205.

The immediate selection area 205 includes the first subset 204 of tiles 202. The number of tiles 202 included in the first subset 204 may be limited to no more than a maximum number. For example, the first subset 204 may include no more than ten total tiles 202, or any integer number of tiles between one and twenty total tiles 202. The selection and population of tiles 202 in the first subset 204 is discussed in more detail, below.

The immediate selection area 205 is illustrated in FIG. 2 as a horizontal ribbon of tiles 202 positioned above the full selection area 210, but may also be presented in additional and/or alternative arrangements including, but not limited to, a vertical ribbon, a carousel, a card stack, a floating arrangement of tiles 202 overlaid on the full selection area 210, or the like. The first subset 204 may include one or more types of tiles 202 corresponding to system applications, user applications, menu functions, media content, etc. As illustrated in FIG. 2, the first subset 204 includes video game application tiles 214, a menu navigation tile 220, and system application tiles 222.

In some embodiments, the video game application tiles 214 are associated with one or more video game application variations corresponding with a video game application group (e.g., multiple versions of the same application, an application produced for different video game platforms or console generations, etc.). In response to a user interaction to select a video game application tile 214, the video game application tile 214 may launch and/or execute the most recently accessed and/or obtained variation of the associated video game application. In some embodiments, the video game application tiles 214 may launch a video game variation selected by a set of priority factors determined to identify the variation of highest interest to the video game player. For example, the priority factors may include playability, backwards compatibility, console generation, etc.

The first subset 204 of tiles 202 may be populated by the video game console based on the most recent applications launched, accessed, and/or obtained by the video game player. In that way, the first subset 204, and the immediate selection area 205 of the library interface 200 may provide rapid and intuitive access to applications of highest interest and/or significance to the video game player. For example, a video game player may wish to access new or updated video game applications on a repeated basis, for which the immediate selection area 205 may permit the video game player to return to a video game application (e.g., through selection of a video game application tile 214) without repeated searching the full selection area 210. In this way, the library interface 200 may permit multiple organization systems for tiles in multiple areas and subsets, while still providing streamlined menu navigation that improves user experience and system performance.

The first subset 204 includes the menu navigation tile 220. As with the interface control tile 212, the menu navigation tile 220 may permit switching navigation between the immediate selection area 205 and the full selection area 210, for example, by switching display emphasis between the two areas when both are displayed concurrently on a display. In some embodiments, a user interaction with the menu navigation tile 220 may hide the first subset 204 of tiles 202 from the display and present the full selection area 210 without the immediate selection area 205. In such cases, the user may switch between the two areas by interacting with the menu navigation tile 220 and the interface control tile 212.

Also illustrated in the figure are the system application tiles 222, which correspond to system applications that may be included in the first subset. In some embodiments, the system application tiles 222 are predefined and included in the first subset by default (e.g., as default computer applications). Alternatively, a number of tiles 202 in the first subset 204 may be reserved for the most recently accessed system application tiles 222, to occupy a set position in the immediate selection area 205 (e.g., the leftmost position in the ribbon of tiles illustrated in FIG. 2). Examples of system application tiles 222 include, but are not limited to, an application store, a platform browser for accessing information and content related to video game applications, a video console chat application, a streaming platform, an online gaming application, or the like. In some embodiments, as when the library interface includes tiles associated with media content, the system application tiles 222 may be associated with other system applications, such as, for example, streaming music platforms, creator forum applications, or the like.

In some cases, the full selection area 210 may include the second subset 206 and the full library 208. As described in more detail in reference to FIGS. 3-4, below, the second subset 206 may be omitted from the full selection area 210 in some circumstances. The second subset 206, as illustrated in FIG. 2, includes a number of promoted tiles 216 presented in an emphasized or otherwise discernable arrangement relative to tiles 202 included in the full library 208. For example, the promoted tiles 216 may be enlarged relative to tiles 202 in the full library 208, and/or may include additional information describing the application indicated in the promoted tiles 216, as described in more detail in reference to FIG. 5, below. As illustrated in FIG. 2, the promoted tiles 216 occupy an uppermost row in the full selection area 210, the row including a smaller number of larger tiles 202.

In this way, a user of the library interface 200 (e.g., the video game player) may be presented with the promoted tiles 216 first upon accessing the full selection area 210. The promoted tiles 216 may be intended to suggest, recommend, and/or surface video game applications that may be of interest to the video game player. As such, the first subset 206 of tiles 202 may be populated with tiles 202 that are not included in the first subset 204 of tiles 202, as described in more detail, below.

The video game console may select tiles 202 from the full library 208 to include in the second subset 206 as the promoted tiles 216. In some embodiments, the number of promoted tiles 216 is predefined by the system application generating and/or presenting the library interface 200 (e.g., library application 152 of FIG. 1, switcher application 154 of FIG. 1, etc.). The number of promoted tiles 216 may be any integer number between one and ten, (e.g., four promoted tiles 216). The tiles 202 included in the full library 208 are selected for the second subset 206 based on one or more selection criteria. For example, the promoted tiles 216 may be populated based on the most recently accessed tiles 202 of the full library 208 that not included in the first subset 204. In the exemplary embodiment, the first subset includes eight video game application tiles 214. As such, the second subset 206 may be selected to include the ninth through the twelfth most recently accessed tiles 202 included in the full library 208 as the promoted tiles 216.

Alternative approaches to selecting the second subset 206 may include, but are not limited to, consideration of application metadata (e.g., video game applications for which new content is available, such as a patch, update, or new downloadable content, that has not been accessed and/or obtained by the video game player), whether a video game application is growing in popularity as indicated by social media activity surrounding the video game application (e.g., the video game application is "trending"), if users connected to the video game player through an online gaming platform have recently accessed and/or installed the video game application, but the video game player has not recently accessed it. Additionally or alternatively, the approaches may include prioritization based on platform generation, installed vs. not-installed applications, full versions vs. demo or trial versions, owned vs. not owned applications, etc.

In this way, the second subset may be populated with promoted tiles 216 that do not represent the first set of tiles 202 following those included in the first subset 204 from the full library 208. Instead, video game applications corresponding to tiles 202 further down in the presentation order in the full library 208 may be selected, to surface those tiles 202 that may present the highest interest to the video game player as an alternative to those tiles 202 already included in the first subset 204. In this way, presenting promoted tiles 216 in the full selection area 210 may reduce redundancy with the first subset 204, thereby providing a streamlined menu navigation experience, increased interaction with video game applications, and reduced library scanning that may in turn reduce computational demands associated with generating and/or presenting the library interface 200.

In some embodiments, additional selection criteria may be applied to determining the second subset 206. For example, the promoted tiles 216 may be limited to exclude applications that are not backwards compatible.

In the context of video game consoles, "backwards compatibility" refers to a video game application that is executable both on latest generation consoles and legacy consoles.

As such, a tile 202 included in the full library 208 that represents video game application that is only executable on the latest generation console or a legacy console may not be selected for inclusion in the second subset 208. As another example, the second subset 206 may exclude, additionally or alternatively, pre-ordered video game applications that have been purchased or scheduled for installation but are not yet released by the publisher and/or content delivery platform. As another example, the second subset 206 may exclude, additionally or alternatively, video game applications that are hidden from the user of the library interface 200.

The term "hidden" refers to video game applications that are installed or otherwise available to some users of the video game console but for which the user of the library interface 200 (e.g., the video game player) does not hold access privileges. For example, this may describe a video application installed by one user of the video game console that has not been shared with other users of the video game console.

The full library 208, as part of the full selection area 210, includes multiple library tiles 218. As with the video game application tiles 214 and the promoted tiles 216, the library tiles 218 are instances of the tiles 202. The library interface 200 may present the full library 208 as a scrollable array of tiles of uniform size and regular arrangement (as indicated by the second row of library tiles 218 being partially obscured at an invisible boundary of the library interface 200 that has been added for clarity of explanation), although alternative arrangements are also possible.

For example, the tiles may be arranged as a card stack, as a rolling card index, as a linear arrangement of tiles in a ribbon (as illustrated for the immediate selection area 205), or the like.

The library tiles 218 may be ordered within the full library 208 according to one or more ordering schemes. For example, the library tiles 218, like the video game application tiles 214, may be arranged in order of most recent interaction and/or availability (e.g., most recently obtained and/or purchased video game application). In such cases, the order of library tiles 218 in the full library 208 may reproduce the order of video game application tiles 214 in the first subset 204. As illustrated in the figure, this is shown by the first two tiles following the system application tiles 222 in the first subset 204 including the same image as the first two library tiles 218 of the full library 208, where the image is an indicator of the video game application associated with the respective tile, as described in more detail in reference to FIG. 5, below.

Other arrangement orders include, but are not limited to, favorite video game applications (for example, by number of launches or cumulative playtime), newest available, most popular based on aggregated rating data, or the like. In some embodiments, the video game player may indicate a preferred tile ordering scheme.

As with the video game application tiles 214, the promoted tiles 216 and library tiles 218 may be configured to launch and/or execute the associated video game application and/or a page including information about the video game application. In some embodiments, the video game console updates the first subset 204 in response to the selection of a promoted tile 216 and/or a library tile 218, by removing one of the video game application tiles 214 from the first subset 204 and replacing it with the selected promoted tile 216 or library tile 218. The video game application tile 214 that is replaced in this way may be placed in the library 208 as a library tile 218, in order of its most recent interaction by the user of the video game console. For example, it may be included in the second subset 206.

Figure 3:
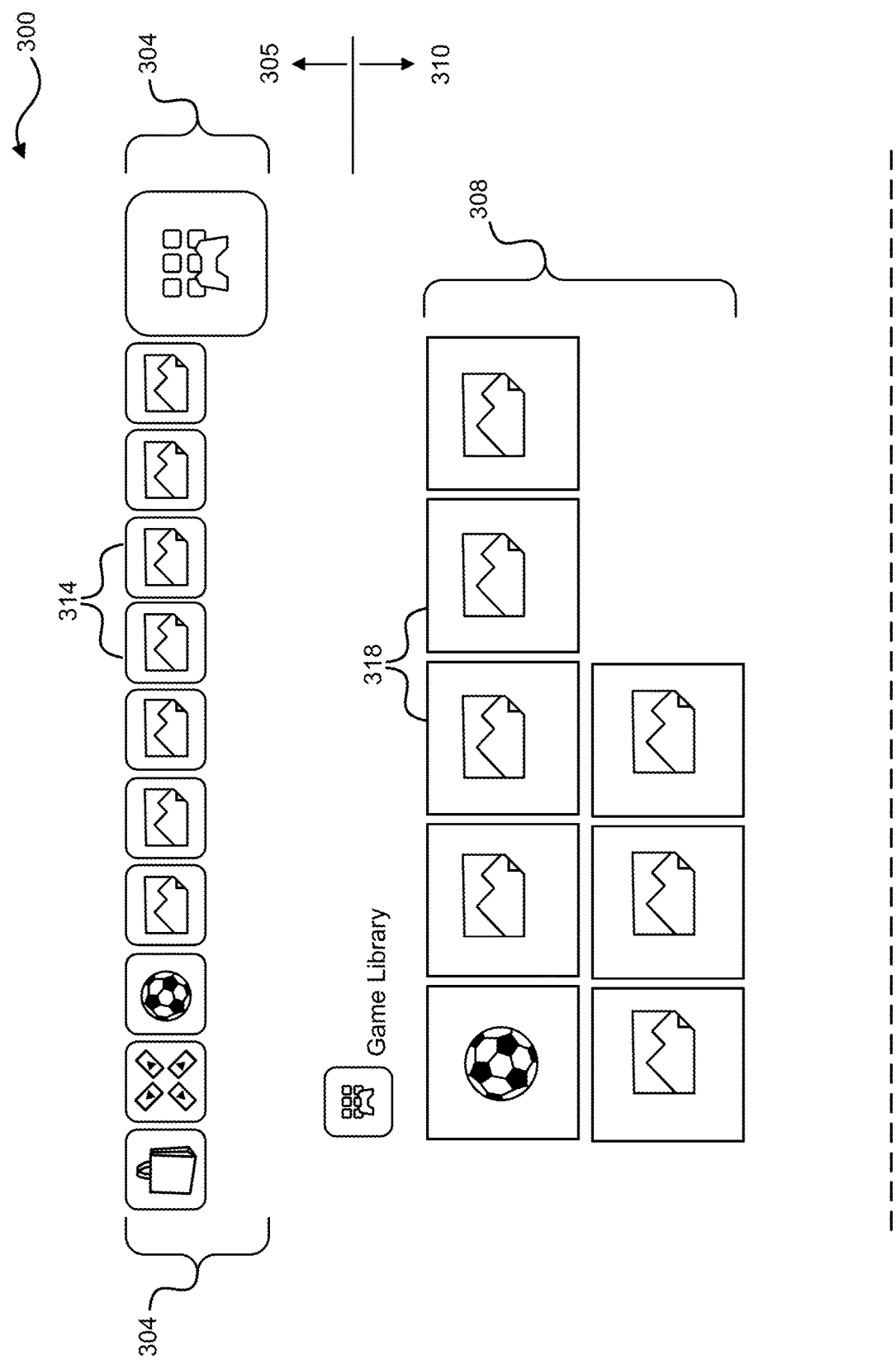
FIG. 3 illustrates another example of a library with selectable tiles, according to an embodiment of the present disclosure.

FIG. 3 illustrates another example of a library interface 300 with an immediate selection area 305 and a full selection area 310, according to an embodiment of the present disclosure. As illustrated in FIG. 3, the library interface 300 includes a first subset 304 in the immediate selection area 305 and a full library 308 in the full selection area 310, as was described in reference to FIG. 2. In contrast to the example of the library interface 200 illustrated in FIG. 2, however, the library interface 300 shown in FIG. 3 does not include a second subset 306 in the full selection area 305.

In some embodiments, as illustrated in FIG. 3, the full library 308 does not include more library tiles 318 than the number of video game application tiles 314 included in the first subset 304. In such cases, the full selection area 310, the equivalent of which contained the promoted tiles 216 in the example of the library interface illustrated in FIG. 2, may exclude the promoted tiles 216. The benefits of the promoted tiles 216, as described in reference to FIG. 2, above, include promoting library tiles that are less recently accessed by the video game player than those already represented in the first subset, which may streamline menu navigation and optimize system processes associated with generating and/or presenting the library interface. For this reason, in the exemplary case of FIG. 3 in which the full library 308 does not include more than, for example, eight library tiles 318 (e.g., when the video game console is new and the user has not yet obtained a sufficient number of applications), the full library 308 may be accessed at a glance without need to navigate beyond the first presentation, as illustrated in FIG. 3.

In some embodiments, the video game system (e.g., as part of the library application 152 of FIG. 1 or the switcher application 154 of FIG. 1) implements logic to determine whether the second subset is to be selected and/or the promoted tiles presented. The logic may include criteria including, but not limited to, selecting the second subset and/or presenting the promoted tiles only if at least a minimum number of video game application tiles 314 are included in the first subset, the full library 308 includes at least a minimum number of library tiles 308, and the difference between the number of library tiles 308 and video game application tiles 314 exceeds a minimum number of promoted tiles. As an illustrative example, the minimum number of video game application tiles 314 may be five tiles, the minimum number of library tiles 308 may be nine tiles, and the minimum number of promoted tiles may be four tiles. Accordingly, in the library interface 300, the number of video game application tiles 314 is eight tiles, and the number of library tiles 308 is also eight tiles. As such, the library interface 300 does not satisfy the logic described above, and the promoted tiles are not selected and/or shown.

Figure 4:
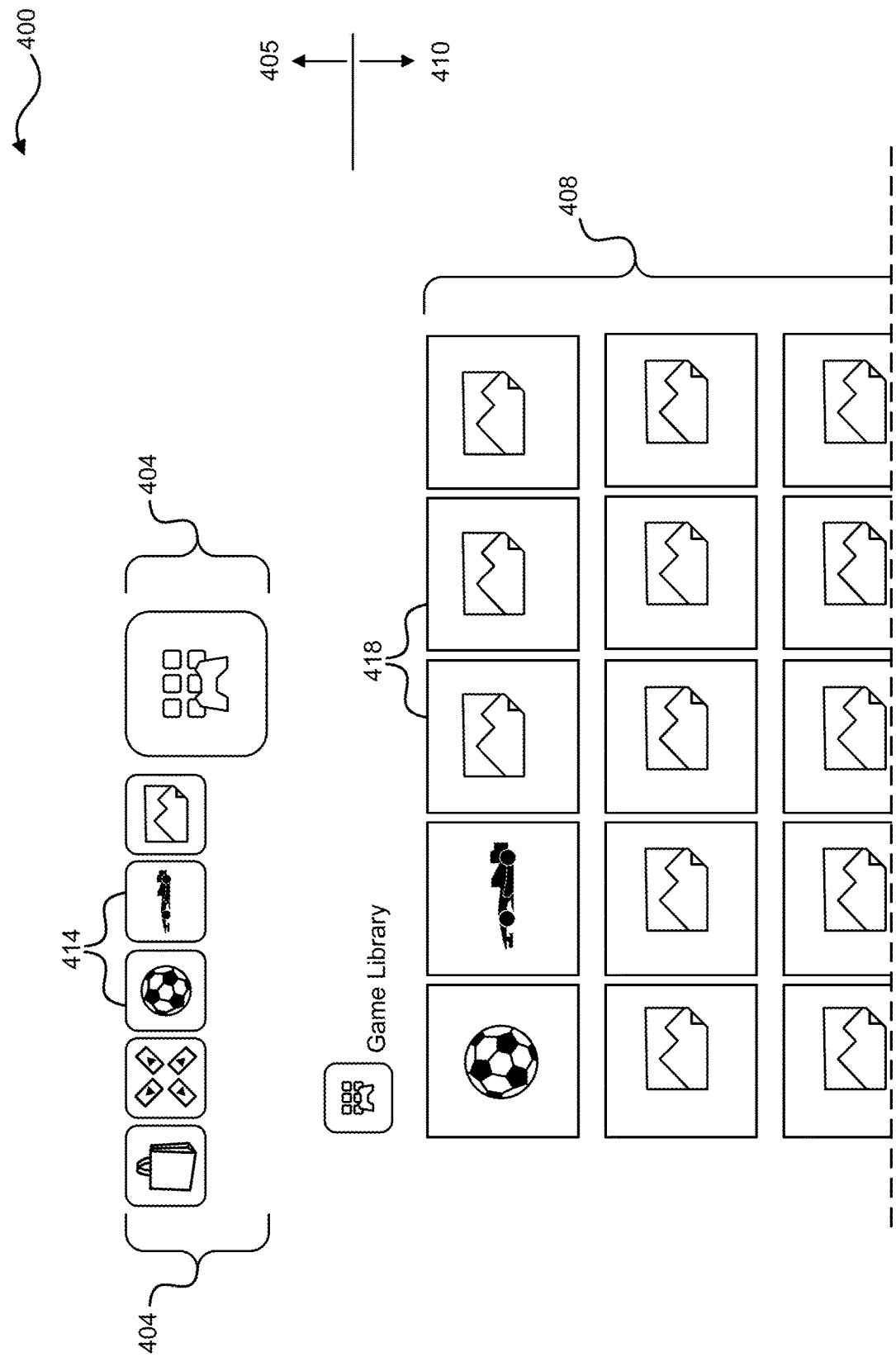
FIG. 4 illustrates another example of a library with selectable tiles, according to an embodiment of the present disclosure.

FIG. 4 illustrates another example of a library interface 400 with an immediate selection area 405 and a full selection area 410, according to an embodiment of the present disclosure. As described in more detail in reference to FIG. 3, above, FIG. 4 demonstrates another embodiment where a second subset may be excluded. In contrast to FIG. 3, the example library interface 400 illustrated in FIG. 4 reflects a video game console including a large number of video game applications (e.g., video game applications 140-142 of FIG. 1). In contrast to FIG. 2, however, the example library interface 400 illustrated in FIG. 4 includes a limited number of video game application tiles 414 in the first subset 404, despite including a large number of library tiles 418 in the full library 408. This can occur when a user has acquired many video games but has only played a few.

In some embodiments, a video game player may launch, install, or otherwise interact with fewer than the maximum limit for the number of video game applications included in the first subset 404. For that reason, despite having access to the large number of library tiles 418, the immediate selection area 405 provides fewer than the maximum allowable number of video game application tiles 414 in the first subset 404. In such cases, the first subset 404 may include additional system application tiles, for example more system application tiles, to populate the immediate selection area 405 with the maximum number of tiles.

As illustrated, the video game player may view library tiles 418 that are not included in the first subset 404 without navigating beyond a first presentation (e.g., without scrolling or otherwise cycling the menu), and the full selection area 410 does not include the second subset (e.g., second subset 206 of FIG. 2) of promoted tiles (e.g., promoted tiles 216 of FIG. 2). Similarly to the example illustrated in FIG. 3, menu navigation in library interface 400 may not benefit from selection of a second subset. Accordingly, the library interface 400 may exclude the promoted tiles, thereby reducing unnecessary redundancy in tile presentation and unnecessary system operations associated with generating and/or presenting the library interface 400. Furthermore, omitting the second subset from the library interface 400 may permit the video game player to view a larger number of library tiles. Applying the logic describe above in reference to FIG. 3, the number of video game application tiles 414 does not satisfy the minimum number of five tiles, and as such the promoted tiles are not selected and/or presented.

Figure 5:
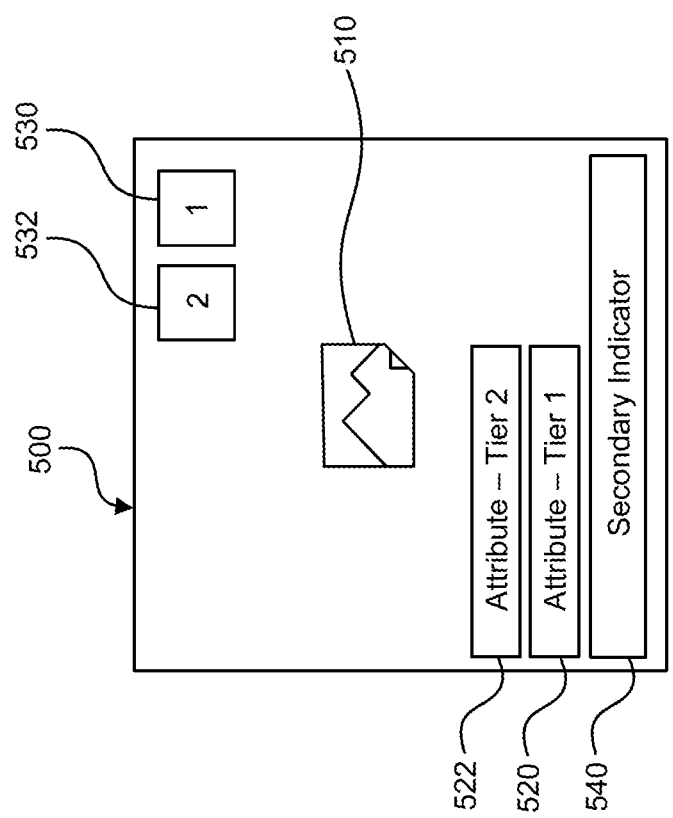
FIG. 5 illustrates an example of an application data hierarchy, according to an embodiment of the present disclosure.

FIG. 5 illustrates an example of a selectable tile 500, according to an embodiment of the present disclosure. Generally, the tile 500 is an example of a UI element that represents one or more video game applications. The arrangement of information in the tile 500 permits the user of the user interface to rapidly identify the correct application in the library (e.g., library interface 200 of FIG. 2) and to launch the associated application and/or content. As illustrated in FIG. 5, the tile 500 may provide a uniform size to the UI elements included in the library (e.g., tiles 202 of FIG. 2) and may permit scaling of the UI elements for emphasis while preserving a uniform visual aesthetic.

The layout and composition of the tile 500 illustrated in FIG. 5 is an example of one of several possible visualization approaches. While the tile 500 is shown with a number of containers (indicated with elements numbers 520, 522, 530, 532, and 540) oriented in regions of the tile 500 and superimposed over a visual motif 510 representative of the video game application, the information described in reference to the containers may also be presented elsewhere. For example, the tile 500 may present only a subset of the containers, while others are presented outside the boundary of the tile 500. In another example, the tile 500 may be presented as part of a list or a detailed list, with information arranged in a table oriented horizontally and/or vertically relative to the tile 500, such that the visual motif 510 serves as an icon and/or badge in one entry of a list entry and the containers (or content thereof) can be shown in one or more entries of the list entry.

In some embodiments, the tile 500 includes one or more attributes and indicators. The attribute(s) and indicator(s) can be presented in the containers. The number of containers and/or content thereof can change depending on whether the tile is in a standard presentation or a detailed presentation. Further, attributes may be organized in tiers, such as a first tier 520 or a second tier 522, although additional tiers are available as needed. The detailed presentation may present additional and/or differing information to that presented in the standard presentation.

In some cases, the first tier attributes 520 represent metadata for the video game application, where the application is indicated by the tile 500. Examples of metadata include, but are not limited to information describing the use and newness of the variation (e.g., whether the variation is new or newly updated, when it was last played, when it was purchased or available, etc.). The metadata may also include information about the file size of the variation (e.g., to identify to the user of the video game console information related to storage capacity and file sizes). Similarly, the metadata may include usage data including, but not limited to cumulative play time (e.g., "hours played"), recent accomplishments, and/or other available content-related information items (e.g., tournament date, item available, reward earned, etc.).

In comparison, the second tier attributes 522 may represent supplementary metadata to the first tier attributes 520. Supplementary metadata may include, but is not limited to, platform information (e.g., new or next-generation console, previous or legacy console, etc.), version information and/or application type (e.g., beta, trial, demo, full game, etc.), information indicating the type of video game content, as when the application includes video game content (e.g., DLC, temporary campaign mission options, etc.). In some embodiments, the tile 500 may show multiple second tier attributes 522, for example, the platform information and the version information (e.g., a beta version on a legacy console). In some embodiments, one or more of the second tier attributes 522 are presented in the detailed presentation, while the standard presentation presents only one or more of the first tier attributes 520. In this case, the second tier attributes 522 are associated with the detailed presentation only, whereas the first tier attributes 520 are associated with both of the presentations.

The indicators may belong to several orders, including, but not limited to primary and secondary orders, with tiers defined for each order. For example, a primary indicator of the first tier 530 may be presented in association with the tile 500 to represent, among other aspects, the "access status" for the application that is indicated by the tile 500. In some embodiments, "access status" indicates whether and in what form the application is available for execution. As an illustrative example, the primary indicator of the first tier 530 may indicate that the application is "pre-ordered," which is to say that the application has been purchased or otherwise reserved, but has not yet been published or otherwise made available for distribution via a computer network.

The primary indicator of the second tier 532 may present additional information describing storage status including, but not limited to, whether the application is installed and on which video game platform it is installed. For example, the primary indicator of the second tier 532 may provide information describing whether data associated with the application is stored locally on the video game console, on an external hard drive in communication with the video game console, or is otherwise available for download. To indicate that a download is necessary to access the application, the primary indicator of the second tier 532 may provide information to that effect, for example, by showing an icon representing a download process.

The secondary indicator 540 may be included with the tile 500 to provide dynamic information related to system processes associated with the variation. For example, the secondary indicator may be presented as a graphical progress bar showing a combination of visual effects including but not limited to color, dynamic elements, shading, and/or lighting effects. For example, the secondary indicator 540 may indicate a download in progress by a progress bar with gradient shading, showing the extent to which the download has progressed for the application in real time. In another example, the secondary indicator 540 may show a progress bar with a different color (e.g., a solid red progress bar showing the download extent at the time an error occurred) to indicate a progress event or download type including, but not limited to, a complete download, an update download, a patch download, or the like.

Figure 6:
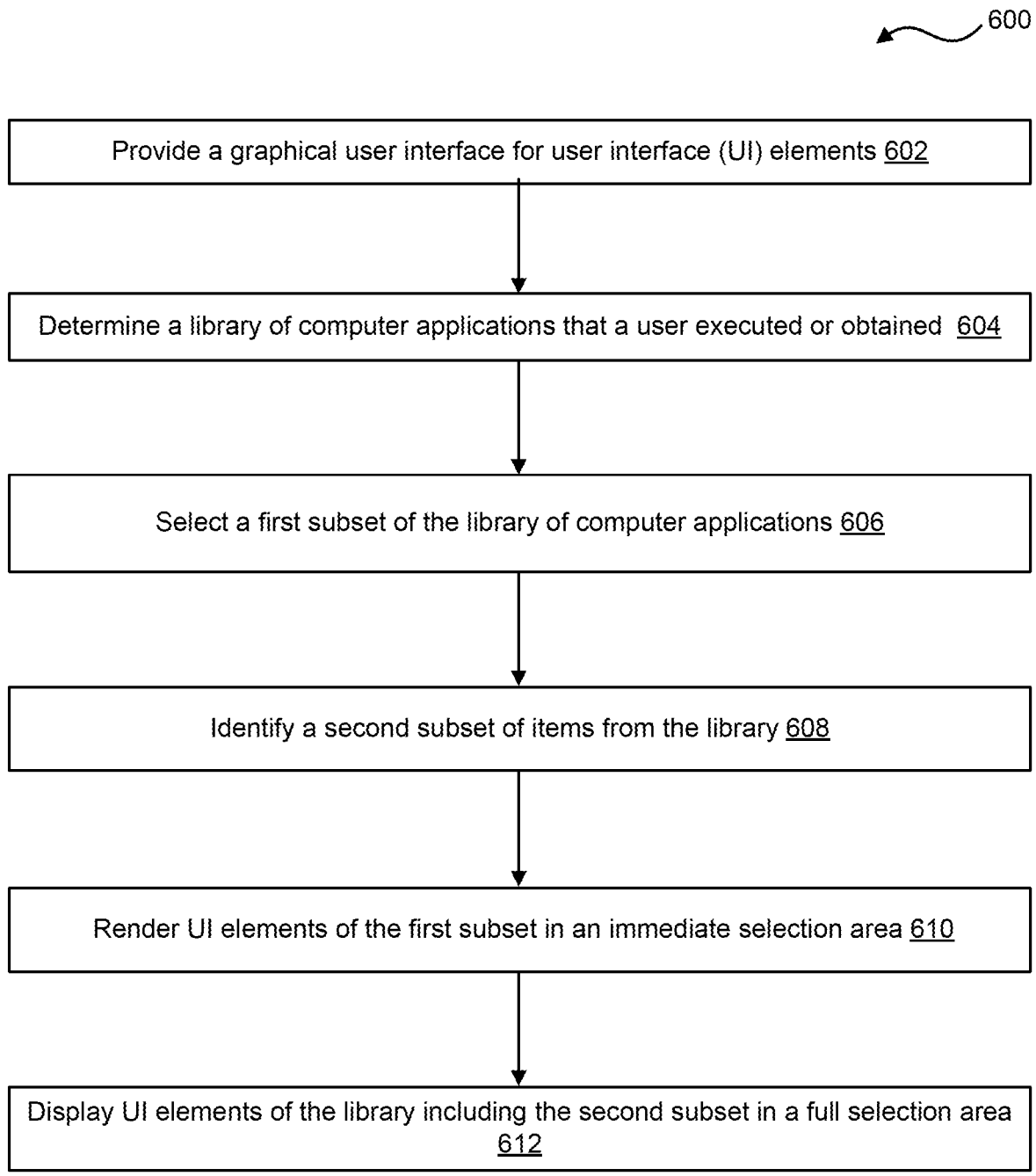
FIG. 6 illustrates an example flow for presenting user interface (UI) elements in an immediate selection area and a full selection area of a graphical user interface, according to embodiments of the present disclosure.

FIG. 6 illustrates an example flow 600 for presenting user interface (UI) elements in an immediate selection area and a full selection area of a graphical user interface, according to embodiments of the present disclosure. The operations of the flow can be implemented as hardware circuitry and/or stored as computer-readable instructions on a non-transitory computer-readable medium of a computer system, such as the video game console 110 of FIG. 1. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, and/or reordered.

In an example, the flow 600 includes an operation 602, where the computer system provides a graphical user interface for user interface (UI) elements. As described in more detail in reference to FIG. 2, the graphical user interface may include a library interface (e.g., library interface 200 of FIG. 2), including an immediate selection area and a full selection area (e.g., immediate selection area 205 and full selection area 210 of FIG. 2).

In an example, the flow 600 includes an operation 604, where the computer system determines a library of computer applications. As described in more detail in reference to FIG. 1, the computer system may include one or more computer applications available (e.g., installed, purchased, shared, or otherwise available) to a user of the computer system. The computer applications may include system applications and user applications, including a menu application that, when executed by the computer system, causes the computer system to generate and/or present the library interface. The library of computer applications may include user applications of a specific type (e.g., video game applications) that are available to the user, for example, through account access privileges, through sharing permissions, or via an online content platform (e.g., a video game streaming platform). Similarly, the library of computer applications may include other types of user applications (e.g., social media applications, content streaming applications, media files associated with one or more media applications, etc.).

In an example, the flow 600 includes an operation 604, where the computer system selects a first subset of the library of computer applications. The library interface may include a first subset (e.g., full subset 204 of FIG. 2) of tiles (e.g., tiles 202 of FIG. 2), where each tile is a UI element associated with one or more video game applications. The first subset may include system application tiles (e.g., system application tiles 222 of FIG. 2) and a menu navigation tile (e.g., menu navigation tile 220 of FIG. 2), to switch menu navigation control between the immediate selection area and the full selection area.

In an example, the flow 600 includes an operation 604, where the computer system renders UI elements of the first subset in an immediate selection area. Optionally, the immediate selection area may include a UI element configured to switch from displaying the immediate selection area to displaying the full selection area, as described in more detail in reference to FIG. 2 (e.g., menu navigation tile 220 of FIG. 2). In some embodiments, a user selection of the UI element for displaying the full selection area displays the full selection area including UI elements of the library. In some embodiments, the UI elements of the first subset may be hidden and/or de-emphasized in response to the user selection of the UI element.

In an example, the flow 600 includes an operation 604, where the computer system identifies a second subset of items from the library. Optionally, the method further includes counting the number of items in the library and comparing the number of items to a threshold value, as described in more detail in reference to FIG. 3 and FIG. 7. In some cases, when the number of items in the library does not meet the threshold value, the computer system may omit the second subset. Similarly, the method may optionally include counting the number of items in the first subset and comparing the number of items in the first subset to a second threshold value. As with the first threshold value, the computer system may identify an empty second subset when the number of items in the first subset does not meet the threshold value.

Optionally, the method may include assessing if a number of items in second subset can meet or exceed a minimum number, and displaying the second subset in accordance. As described in more detail in reference to FIG. 3, above, when the second subset cannot contain the minimum number of items, the computer system may exclude the second subset from the graphical user interface.

In an example, the flow 600 includes an operation 604, where the computer system displays UI elements of the library including the second subset in a full selection area. As described in more detail in reference to FIG. 2, the second subset, including a minimum number of promoted tiles, may be presented as emphasized tiles containing information, as described in reference to FIG. 5.

Figure 7:
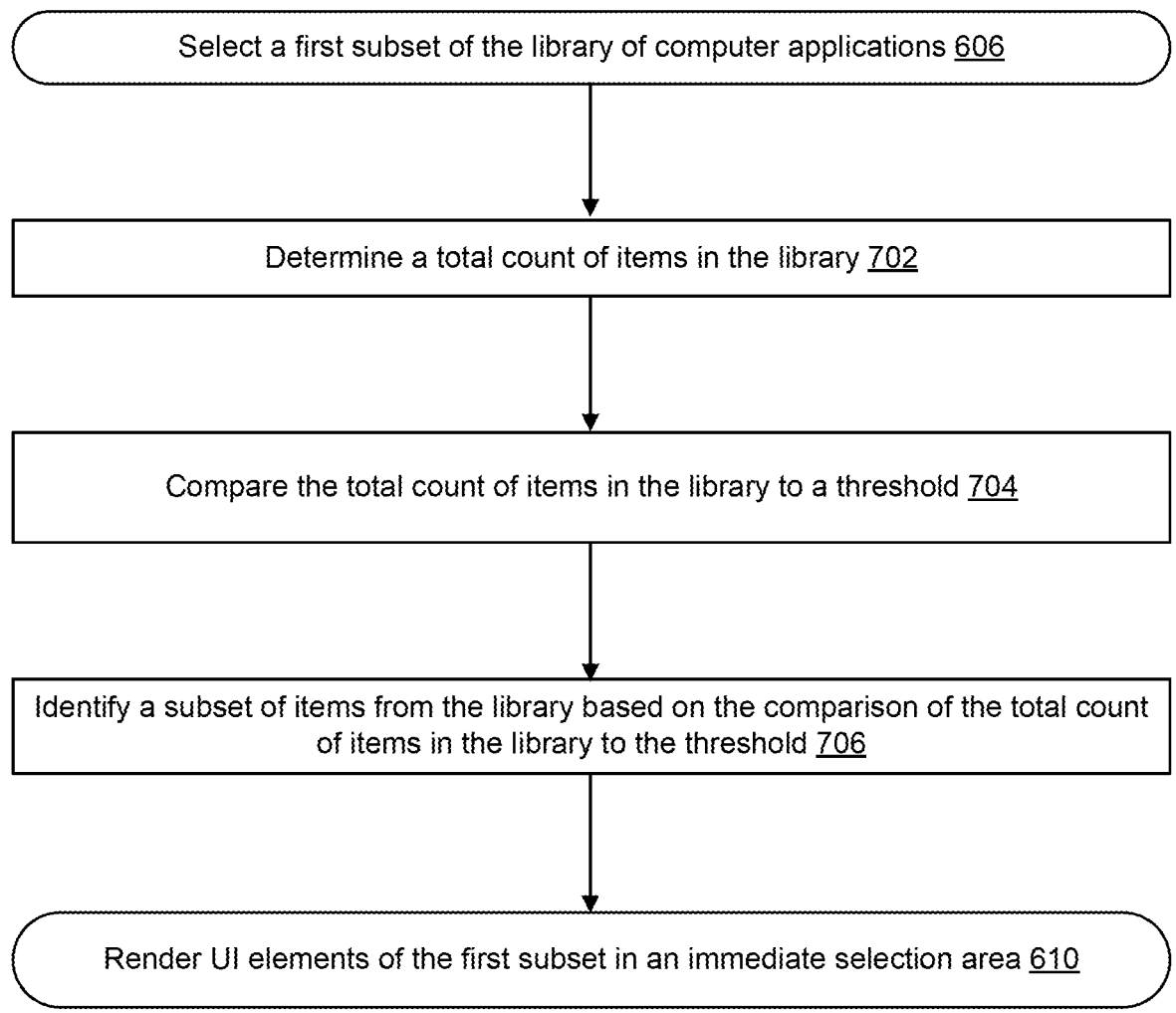
FIG. 7 illustrates an example flow for identifying a subset of items in a library of computer applications by comparison to a threshold, according to embodiments of the present disclosure.

FIG. 7 illustrates an example flow 700 for identifying a subset of items in a library of computer applications by comparison to a threshold, according to embodiments of the present disclosure. The operations of the flow can be implemented as hardware circuitry and/or stored as computer-readable instructions on a non-transitory computer-readable medium of a computer system, such as the video game console 110 of FIG. 1. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, and/or reordered.

As illustrated, flow 700 includes steps to determine whether criteria for presenting promoted tiles (e.g., promoted tiles 216 of FIG. 2) are met. As such, the operations of flow 700 are shown following operation 606 of FIG. 6 and preceding operation 610 of FIG. 6. In some embodiments, the operations of flow 700 may be reordered with respect to the operations of flow 600 of FIG. 6.

In an example, the flow 700 includes an operation 702, where the computer system determines a total count of items in the library. As described in more detail in reference to FIG. 3, the computer system may implement logic to determine whether to include the second subset (e.g., second subset 206) of tiles (e.g., tiles 202 of FIG. 2) in the full selection area (e.g., full selection area 210 of FIG. 2) of the library interface (e.g., library interface 200 of FIG. 2). In some embodiments, the total number of tiles in the library must meet or exceed a minimum number of tiles for the computer to select a second subset of tiles. As described in reference to FIG. 3, the total number of tiles may include the number of tiles in the full library (e.g., full library 208 of FIG. 2).

In an example, the flow 700 includes an operation 704, where the computer system compares the total count of items in the library to a threshold. The threshold, as described in more detail in reference to FIGS. 2-3, may incorporate one or more criteria. For example, the threshold may incorporate a defined number of promoted tiles (e.g., four promoted tiles in the full selection area), the current total number of items in the library, and the size of the first subset (e.g., as selected in operation 606 of FIG. 6). In some embodiments, the comparison includes finding the difference between the size of the first subset and the total number of items in the library.

In an example, the flow 700 includes an operation 706, where the computer system identifies a subset of items from the library based on the comparison of the total count of items in the library to the threshold. As described in more detail in reference to FIGS. 2-4, when the difference between the total number of items in the library and the size of the first subset exceeds the threshold, the computer system may select the subset of items from the library (e.g., second subset 206 of FIG. 2).

In some embodiments, the subset of items from the library includes the defined number of items that are not included in the first subset. For example, if the total number of items in the library is fourteen, the size of the first subset is eight, and the defined number of items in the subset of items is four, the computer system will select four items from the six items in the library that are not included in the first subset. In this example, if the total number of items in the library is less than twelve (e.g., two items are removed from the library), the computer system may omit the subset of items from the library.

Figure 8:
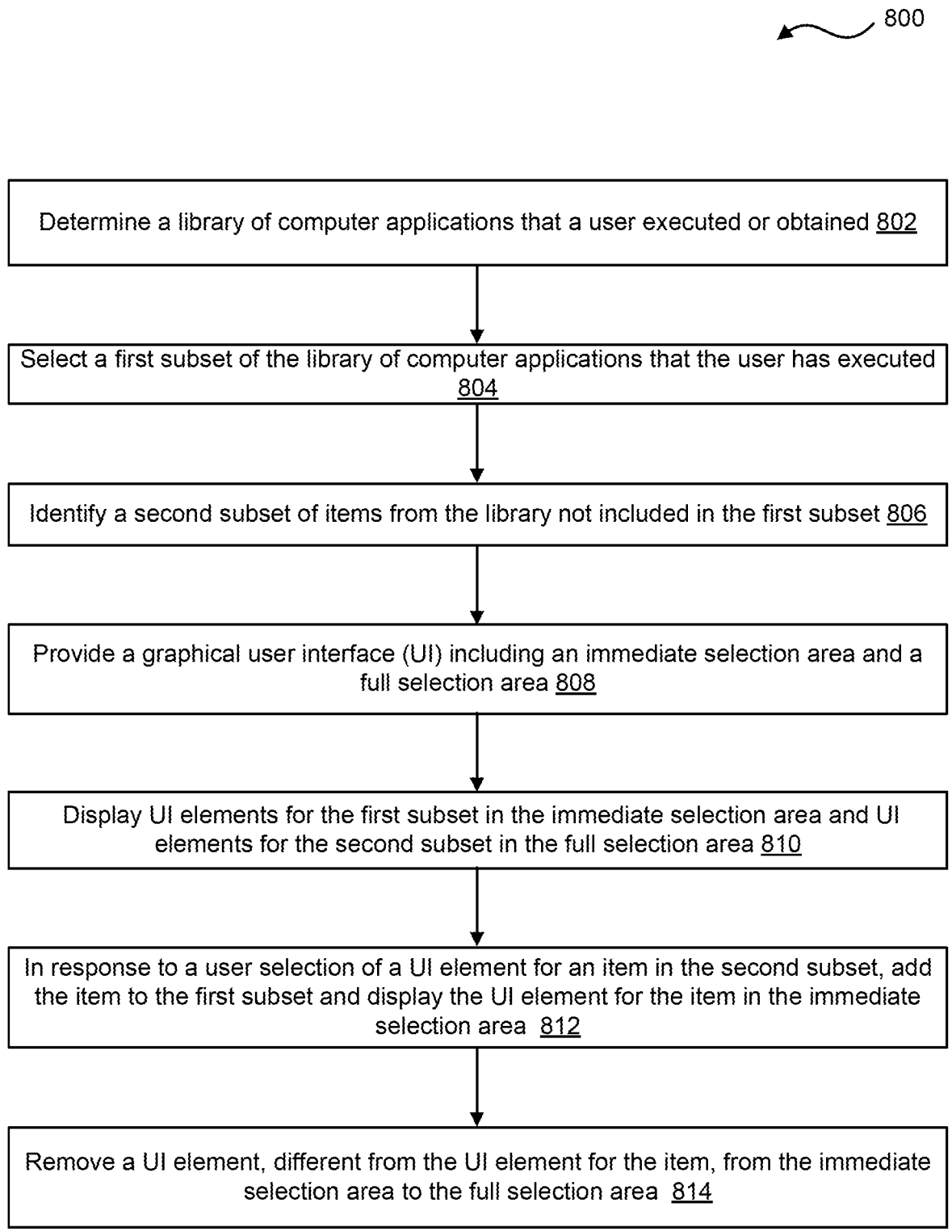
FIG. 8 illustrates an example flow for reassigning a user interface element for an item in a second subset of items from a full selection area to an immediate selection area of a graphical user interface, according to embodiments of the present disclosure.

FIG. 8 illustrates an example flow for reassigning a user interface element for an item in a second subset of items from a full selection area to an immediate selection area of a graphical user interface, according to embodiments of the present disclosure. The operations of the flow can be implemented as hardware circuitry and/or stored as computer-readable instructions on a non-transitory computer-readable medium of a computer system, such as the video game console 110 of FIG. 1. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, and/or reordered.

In an example, the flow 800 includes an operation 802, where the computer system determines a library of computer applications that a user executed or obtained. As described in more detail in reference to FIGS. 1-2 and FIG. 6, the computer system, for example, through execution of a system application (e.g., library application 152 of FIG. 1, switcher application 154 of FIG. 1, etc.), identifies user applications available to the user of the computer system (e.g., video game player 122 of FIG. 1). The user applications are associated with a number of tiles for presentation in a library interface (e.g., library interface 200 of FIG. 2). Each tile in the library interface is associated with at least one user application.

In an example, the flow 800 includes an operation 804, where the computer system selects a first subset of the library of computer applications. As described in more detail in reference to FIG. 2, the first subset of the library of computer applications (e.g., first subset 204 of FIG. 2) is selected based on one or more criteria. For example, the subset may include the most recently launched and/or obtained computer applications used by the user of the computer system, up to a maximum number of applications. In some embodiments, the maximum number of applications is eight, although other limits are possible.

In an example, the flow 800 includes an operation 806, where the computer system identifies a second subset of items from the library. As described in more detail in reference to FIG. 2 and FIGS. 6-7, the computer selects the second subset to identify and/or promote computer applications that are not included in the first subset, that may reduce menu navigation and computational demands associated with generating and/or presenting the full library of computer applications (e.g., full library 208 of FIG. 2).

In an example, the flow 800 includes an operation 808, where the computer system provides a graphical user interface (UI) including an immediate selection area and a full selection area. As described in more detail in reference to FIG. 2, the user of the computer system may use a menu navigation control (e.g., menu navigation tile 212 of FIG. 2) to switch between the immediate selection area and the full selection area.

In an example, the flow 800 includes an operation 810, where the computer system displays UI elements for the first subset in the immediate selection area and UI elements for the second subset in the full selection area.

In an example, the flow 800 includes an operation 812, where, in response to a user selection of a UI element for an item in the second subset, the computer system adds the item to the first subset and displays the UI element for the item in the immediate selection area. As described above, the computer system selects the first subset to include computer applications most recently launched and/or obtained. As such, upon launching a computer application from the second subset, or from the full library outside the computer applications already included in the first subset, the computer system will add the selected computer application to the first set and remove it from the second subset.

In an example, the flow 800 includes an operation 814, where the computer system removes a UI element, different from the UI element for the item, from the immediate selection area to the full selection area. As described above, the number of computer applications in the first subset may be limited to a maximum number of computer applications. In this way, if the first subset already includes the maximum number of computer applications, the computer system removes a computer application from the first subset to add the application selected from the second subset. For example, if the first subset includes the maximum number of user applications (e.g., video game applications, media applications, audiovisual content files, etc.) and a user application from the second subset is to be added, the computer system may remove the least recently launched and/or obtained user application from the immediate selection area.

Figure 9:
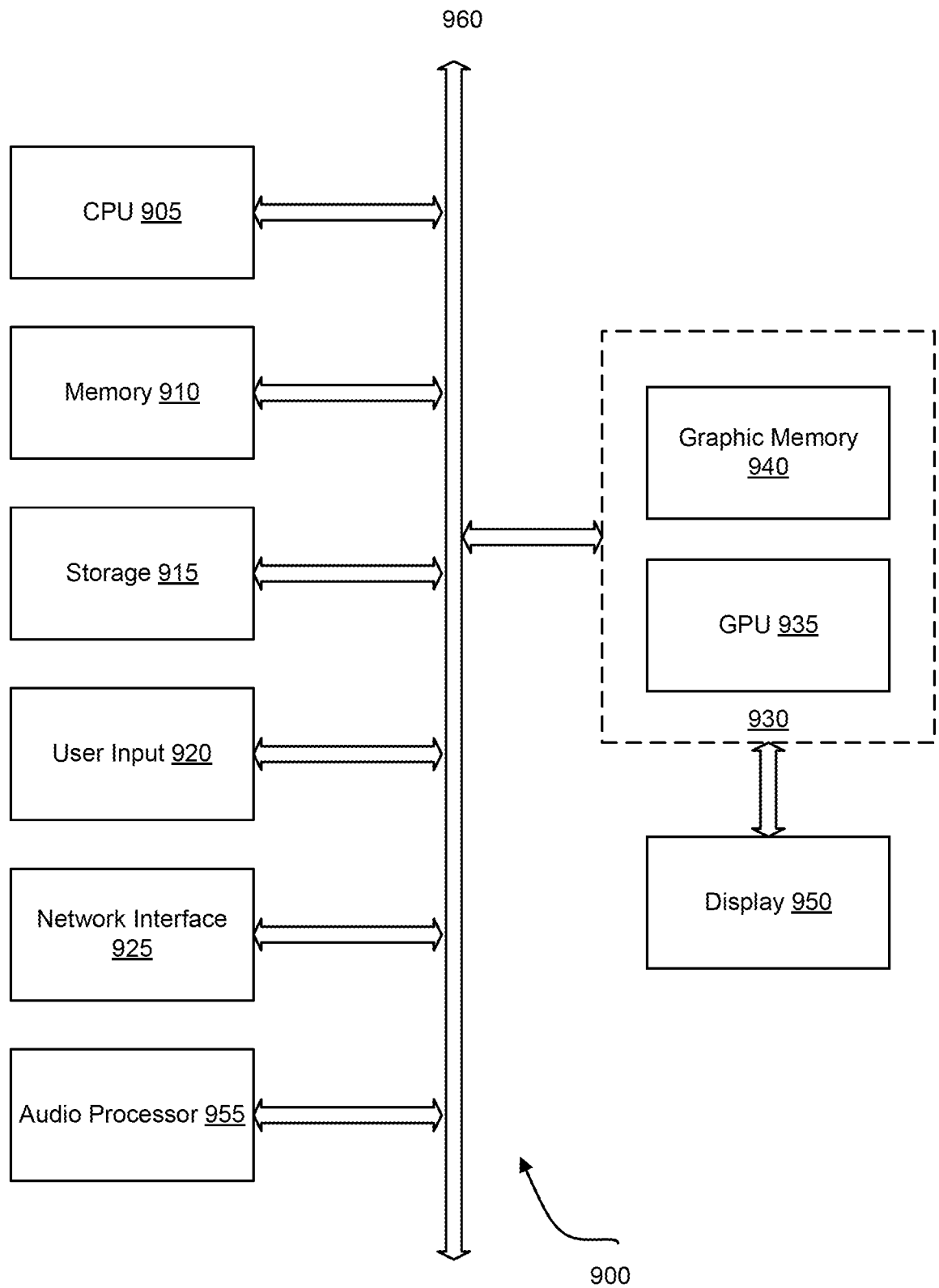
FIG. 9 illustrates an example of a hardware system suitable for implementing a computer system, according to embodiments of the present disclosure.

FIG. 9 illustrates an example of a hardware system suitable for implementing a computer system, according to embodiments of the present disclosure. The computer system 900 represents, for example, a video game system, a backend set of servers, or other types of a computer system. The computer system 900 includes a central processing unit (CPU) 905 for running software applications and optionally an operating system. The CPU 905 may be made up of one or more homogeneous or heterogeneous processing cores. Memory 910 stores applications and data for use by the CPU 905. Storage 915 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 920 communicate user inputs from one or more users to the computer system 900, examples of which may include keyboards, mice, joysticks, touch pads, touch screens, still or video cameras, and/or microphones. Network interface 925 allows the computer system 900 to communicate with other computer systems via an electronic communications network, and may include wired or wireless communication over local area networks and wide area networks such as the Internet. An audio processor 955 is adapted to generate analog or digital audio output from instructions and/or data provided by the CPU 905, memory 910, and/or storage 915. The components of computer system 900, including the CPU 905, memory 910, data storage 915, user input devices 920, network interface 925, and audio processor 955 are connected via one or more data buses 960.

A graphics subsystem 930 is further connected with the data bus 960 and the components of the computer system 900. The graphics subsystem 930 includes a graphics processing unit (GPU) 935 and graphics memory 940. The graphics memory 940 includes a display memory (e.g., a frame buffer) used for storing pixel data for each pixel of an output image. The graphics memory 940 can be integrated in the same device as the GPU 935, connected as a separate device with the GPU 935, and/or implemented within the memory 910. Pixel data can be provided to the graphics memory 940 directly from the CPU 905. Alternatively, the CPU 905 provides the GPU 935 with data and/or instructions defining the desired output images, from which the GPU 935 generates the pixel data of one or more output images. The data and/or instructions defining the desired output images can be stored in the memory 910 and/or graphics memory 940. In an embodiment, the GPU 935 includes 3D rendering capabilities for generating pixel data for output images from instructions and data defining the geometry, lighting, shading, texturing, motion, and/or camera parameters for a scene. The GPU 935 can further include one or more programmable execution units capable of executing shader programs.

The graphics subsystem 930 periodically outputs pixel data for an image from the graphics memory 940 to be displayed on the display device 950. The display device 950 can be any device capable of displaying visual information in response to a signal from the computer system 900, including CRT, LCD, plasma, and OLED displays. The computer system 900 can provide the display device 950 with an analog or digital signal.

In accordance with various embodiments, the CPU 905 is one or more general-purpose microprocessors having one or more processing cores. Further embodiments can be implemented using one or more CPUs 905 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" includes within a tolerance of ±0.01%, ±0.1%, ±1%, ±2%, ±3%, ±4%, ±5%, ±8%, ±10%, ±15%, ±20%, ±25%, or as otherwise known in the art. "Substantially" refers to more than 76%, 135%, 90%, 100%, 105%, 109%, 109.9% or, depending on the context within which the term substantially appears, value otherwise as known in the art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of arranging a graphical user interface having multiple selection interfaces, the method comprising:
   providing a graphical user interface for user interface (UI) elements, some of the UI elements being selectable to launch or resume a corresponding computer application, the graphical user interface including an immediate selection area and a full selection area, the full selection area including a library area and a promoted area at a top or a side of the full selection area;
   determining a library of computer applications that a user executed or obtained;
   selecting a first subset of the library of computer applications based on a last execution date of each of the computer applications by the user, a number of items in the first subset being limited;
   rendering UI elements of the first subset on the graphical user interface in the immediate selection area;
   rendering UI elements for the library of computer applications, including the first subset, on the graphical user interface in the library area of the full selection area;
   determining that the promoted area will be displayed in response to:
      determining that the number of items in the first subset is at least a first number of items,
      determining a difference between a total number of items in the library of computer applications and the number of items in the first subset, and
      determining that the difference is greater than or equal to a minimum number of UI elements displayable in the promoted area;
   identifying a second subset of items from the library that are not within the first subset in response to determining that the promoted area will be displayed; and
   displaying the promoted area of the full selection area in response to identifying the second subset of items from the library, wherein UI elements of the second subset are displayed in the promoted area.

2. The method of claim 1 wherein a library UI element for displaying the full selection area is included in the immediate selection area.

3. The method of claim 2 further comprising:
   receiving a selection by the user of the library UI element, wherein the displaying of the UI elements of the library is based upon the user selection.

4. The method of claim 1 further comprising:
   launching a first computer application in response to a user's selection of a corresponding UI element in the second subset of the graphical user interface;
   adding, based on the launching, the first computer application to the first subset and re-rendering the UI elements of the first subset; and removing a second computer application from the first subset.

5. The method of claim 1 wherein:
the UI elements of the first subset share a common size with each other,
the UI elements of the second subset share a common size with each other, and
the UI elements of the library not including the second subset share a common size with each other.

6. The method of claim 5 wherein the common sizes of the UI elements of the first subset and the UI elements of the library not including the second subset are an equal size.

7. The method of claim 1 further comprising:
including a fixed set of default computer applications in the first subset.

8. The method of claim 1 wherein the rendering of the UI elements of the first subset is aligning the UI elements of the first subset in a single row at a top of the graphical user interface or a single column on a side of the graphical user interface.

9. The method of claim 1 wherein the displaying of the UI elements of the second subset includes aligning the UI elements of the second subset in a single row.

10. The method of claim 1 wherein the computer applications are video games.

11. The method of claim 1, wherein the UI elements of the first subset and the UI elements for the library are arranged in a same order based on a last interaction date of each of the computer applications by the user.

12. The method of claim 1, wherein the UI elements of the second subset are further included in the library area of the full selection area and displayed after one or more of the UI elements of the first subset displayed in the library area.

13. A non-transitory computer-readable medium for arranging a graphical user interface having multiple selection interfaces, the non-transitory computer-readable medium embodying information indicative of instructions for causing one or more machines to perform operations comprising:
providing a graphical user interface for user interface (UI) elements, some of the UI elements being selectable to launch or resume a corresponding computer application, the graphical user interface including an immediate selection area and a full selection area, the full selection area including a library area and a promoted area at a top or a side of the full selection area;
determining a library of computer applications that a user executed or obtained;
selecting a first subset of the library of computer applications based on a last execution date of each of the computer applications by the user, a number of items in the first subset being limited;
rendering UI elements of the first subset on the graphical user interface in the immediate selection area;
rendering UI elements for the library of computer applications, including the first subset, on the graphical user interface in the library area of the full selection area;
determining that the promoted area will be displayed in response to:
determining that the number of items in the first subset is at least a first number of items,
determining a difference between a total number of items in the library of computer applications and the number of items in the first subset, and
determining that the difference is greater than or equal to a minimum number of UI elements displayable in the promoted area;
identifying a second subset of items from the library that are not within the first subset in response to determining that the promoted area will be displayed; and
displaying the promoted area of the full selection area in response to identifying the second subset of items from the library, wherein UI elements of the second subset are displayed in the promoted area.

14. The medium of claim 13 further comprising operations for:
launching a first computer application in response to a user's selection of a corresponding UI element in the second subset of the graphical user interface;
adding, based on the launching, the first computer application to the first subset and re-rendering the UI elements of the first subset; and
removing a second computer application from the first subset.

15. The medium of claim 13, wherein the UI elements of the first subset and the UI elements for the library are arranged in a same order based on a last interaction date of each of the computer applications by the user.

16. The medium of claim 13, wherein the UI elements of the second subset are further included in the library area of the full selection area and displayed after one or more of the UI elements of the first subset displayed in the library area.

17. A computer system having multiple selection interfaces, the system comprising:
a memory; and
at least one processor operatively coupled to the memory and executing instructions from the memory comprising program code for:
providing a graphical user interface for user interface (UI) elements, some of the UI elements being selectable to launch or resume a corresponding computer application, the graphical user interface including an immediate selection area and a full selection area, the full selection area including a library area and a promoted area at a top or a side of the full selection area;
determining a library of computer applications that a user obtained;
selecting a first subset of the library of computer applications based on a last execution date of each of the computer applications by the user, a number of items in the first subset being limited;
rendering UI elements of the first subset on the graphical user interface in the immediate selection area;
rendering UI elements for the library of computer applications, including the first subset, on the graphical user interface in the library area of the full selection area;
determining that the promoted area will be displayed in response to:
determining that the number of items in the first subset is at least a first number of items,
determining a difference between a total number of items in the library of computer applications and the number of items in the first subset, and
determining that the difference is greater than or equal to a minimum number of UI elements displayable in the promoted area;
identifying a second subset of items from the library that are not within the first subset in response to determining that the promoted area will be displayed; and
displaying the promoted area of the full selection area in response to identifying the second subset of items from the library, wherein UI elements of the second subset are displayed in the promoted area.

18. The system of claim 17 further comprising program code for:
- launching a first computer application in response to a user's selection of a corresponding UI element in the second subset of the graphical user interface;
- adding, based on the launching, the first computer application to the first subset and re-rendering the UI elements of the first subset; and
- removing a second computer application from the first subset.

19. The system of claim 17, wherein the UI elements of the first subset and the UI elements for the library are arranged in a same order based on a last interaction date of each of the computer applications by the user.

20. The system of claim 17, wherein the UI elements of the second subset are further included in the library area of the full selection area and displayed after one or more of the UI elements of the first subset displayed in the library area.

* * * * *